United States Patent
Springer et al.

(10) Patent No.: US 8,196,568 B2
(45) Date of Patent: Jun. 12, 2012

(54) COLD START GAS COMPONENT RETENTION SYSTEM IN EGR CIRCUIT WITH RECIRCULATED GAS CONTROL

(75) Inventors: Moritz Klaus Springer, Hagen (DE); Thomas Lorenz, Köln (DE); Helmut Hans Ruhland, Eschweiler (DE)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

(21) Appl. No.: 12/485,197

(22) Filed: Jun. 16, 2009

(65) Prior Publication Data

US 2010/0313858 A1 Dec. 16, 2010

(51) Int. Cl.
*F02N 25/07* (2006.01)
*F02B 33/44* (2006.01)
*F02B 47/08* (2006.01)
*F02M 25/07* (2006.01)

(52) U.S. Cl. ......... 123/568.11; 123/568.12; 123/568.18; 123/568.21; 60/278; 60/605.2

(58) Field of Classification Search ............. 123/568.11, 123/568.12, 568.15, 568.17, 568.18, 568.2, 123/568.21, 568.23, 568.24, 568.25, 568.26, 123/568.27, 568.28; 60/278, 279, 297, 298, 60/299, 300, 301, 302, 281, 282, 284, 287, 60/288, 292, 309, 311, 320, 605.2
See application file for complete search history.

(56) References Cited

U.S. PATENT DOCUMENTS

| | | | |
|---|---|---|---|
| 5,497,619 A | | 3/1996 | Yamada et al. |
| 5,592,925 A | * | 1/1997 | Machida et al. ......... 123/568.11 |
| 5,701,736 A | | 12/1997 | Morishima et al. |
| 5,927,075 A | * | 7/1999 | Khair .......................... 60/605.2 |
| 5,946,906 A | | 9/1999 | Akazaki et al. |
| 7,296,403 B2 | * | 11/2007 | Goebelbecker ................. 60/297 |
| 8,001,778 B2 | * | 8/2011 | Sun .............................. 60/605.2 |
| 2007/0186910 A1 | * | 8/2007 | Leone et al. ..................... 123/520 |
| 2008/0163855 A1 | * | 7/2008 | Matthews et al. ......... 123/568.12 |
| 2009/0120061 A1 | * | 5/2009 | Elwart et al. .................... 60/274 |
| 2009/0120063 A1 | * | 5/2009 | Uhrich et al. ................... 60/278 |
| 2009/0120064 A1 | * | 5/2009 | Uhrich et al. ................... 60/278 |
| 2009/0120065 A1 | * | 5/2009 | Uhrich et al. ................... 60/284 |
| 2009/0120067 A1 | * | 5/2009 | Elwart et al. .................... 60/285 |

FOREIGN PATENT DOCUMENTS

EP 1703116 9/2006

OTHER PUBLICATIONS

Jason A. Lupescu, "Hydrocarbon Retaining and Purging System", U.S. Appl. No. 61/081,686, filed Jul. 17, 2008, 28 Pgs.

* cited by examiner

*Primary Examiner* — Stephen K Cronin
*Assistant Examiner* — Raza Najmuddin
(74) *Attorney, Agent, or Firm* — Julia Voutyras; Alleman Hall McCoy Russell & Tuttle LLP

(57) ABSTRACT

Methods and systems are provided for managing exhaust gases from an internal combustion engine are described. In one example system, hydrocarbons in engine exhaust gases may be stored during an engine cold start and later released into an intake manifold of the engine. The methods and systems may reduce engine hydrocarbon emissions.

20 Claims, 8 Drawing Sheets

COLD START GAS COMPONENT RETENTION SYSTEM IN EGR CIRCUIT WITH RECIRCULATED GAS CONTROL

FIELD

The present description relates generally to an exhaust treatment system for a combustion engine, and to methods and systems to control emissions during cold starts with a gas component retention system in an exhaust gas recirculation (EGR) circuit, where recirculated gas concentration is controlled based on operating conditions.

BACKGROUND/SUMMARY

Internal combustion engines can experience increased emissions during cold starts. Since the catalyst is not lit off, engine raw emissions may not be sufficiently converted by the catalytic converter. Some attempts to reduce the amount of raw emission introduction into the atmosphere during cold starts include loading catalytic converters with relatively large amounts of precious metals, or providing alternative cold start strategies that may be integrated in the engine control unit (ECU).

One such cold start strategy is disclosed in U.S. Pat. No. 5,497,619, wherein an exhaust passage connecting an exhaust manifold to an exhaust pipe bends at 90 degrees. A catalyst unit is on the exhaust passage located downstream from the bend. An HC adsorbent is provided in an extended portion near the bend, in a straight traveling direction from the exhaust manifold. The HC adsorbent is arranged to trap hydrocarbons discharged from the exhaust manifold at startup by being brought into collision with the HC adsorbent by inertia. An EGR pipe is connected downstream from the HC adsorbent. The EGR pipe is connected to an intake manifold via an EGR control valve. When the operation condition of the engine satisfies an EGR condition similar to a conventional case, the EGR control valve is opened, and the intake manifold and HC adsorbent communicate with each other. As a result, part of the exhaust gas begins to flow through the HC adsorbent, causing the HC adsorbent to be heated by the heat of the exhaust gas, and desorption of the HC trapped in the adsorbent begins.

The inventors herein have recognized several issues with this approach. As one example, only until the engine satisfies the EGR flow enabling condition does the exhaust flow through the HC trap. Prior to then the exhaust flow is directed through the catalyst, to the atmosphere, while the catalyst is still too cold to be effective. The amount of absorption of the hydrocarbons by the HC adsorbent is limited by the amount of interaction the exhaust gas makes with the adsorbent as it rounds the bend on its way to the catalyst, which can be relatively low especially for initial combustion events.

In order to at least partially address these shortcomings, methods and systems are provided for managing exhaust gases from an internal combustion engine. One example exhaust system may include an EGR line configured to route a selected amount of exhaust gases from an exhaust passage of the engine toward an intake passage of the engine. A gas component reduction element may be located in the EGR line, and may be configured to reduce a quantity of one or more selected components from the selected amount of exhaust gases. A treated exhaust line may be coupled with the EGR line, and may be configured to route a first portion of the selected amount of the exhaust gases from the gas component reduction element to pass into the intake passage of the engine, and to allow a second portion of the selected amount of the exhaust gases to the atmosphere.

In this way, increased exhaust gases may pass through the gas component reduction element before passing to the atmosphere while the catalyst is still cold where selected components, such as hydrocarbons, may be absorbed. Also in this way, the engine performance may be kept within a predetermined range by selectively allowing only the first portion to pass into the intake passage, and allowing for EGR ratio control during the initial engine starting.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
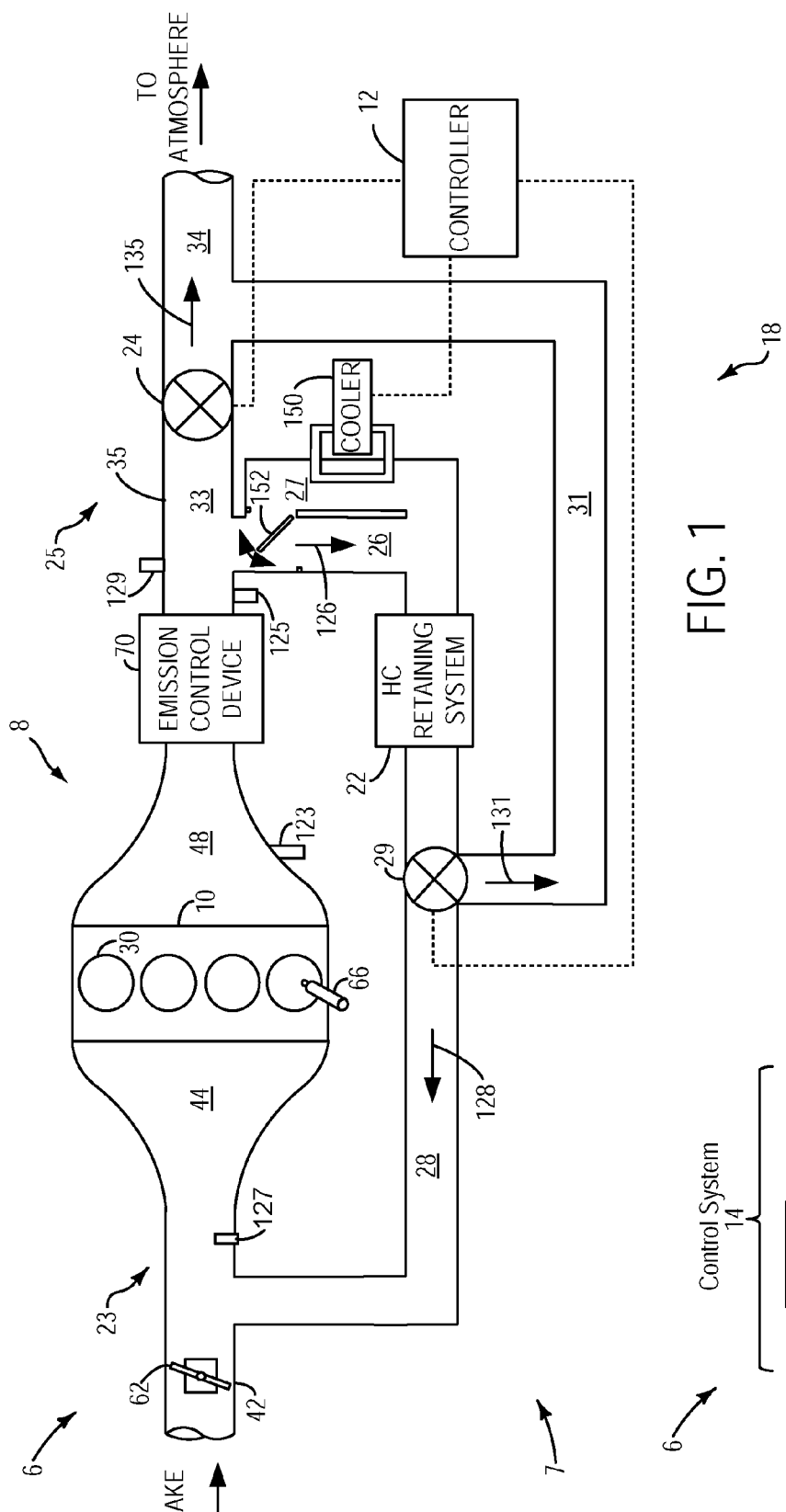
FIG. 1 shows a schematic depiction of an engine and an associated exhaust system.

FIG. 1 shows a schematic depiction of an example vehicle system 6, including an engine system 8. The engine system 8 may include an engine 10 having a plurality of cylinders 30. The engine system 8 may include an exhaust system 7 configured to control the exhaust of the engine 10. The engine 10 may include an engine intake 23 and an engine exhaust 25. The engine intake 23 may include a throttle 62 fluidly coupled to the engine intake manifold 44 via an intake passage 42. The engine exhaust 25 may include an exhaust manifold 48 leading to an exhaust passage 35 that routes exhaust gas to the atmosphere. The exhaust passage 35 may have an upstream portion 33 located upstream from a valve 24, and a downstream portion 34 located downstream from the valve 24. The engine exhaust 25 may include one or more emission control devices 70, which may be mounted in a close-coupled position in the exhaust. The one or more emission control devices 70 may include, for example, a three-way catalyst, lean NOx trap, particulate filter, oxidation catalyst, etc.

The exhaust system 7 may include an EGR line 28. The EGR line 28 may be configured to route a selected amount of exhaust gases from the exhaust passage 35 of the engine 10 toward the intake passage 42 of the engine 10. The exhaust system 7 may also include a gas component reduction element in the retaining system 22 on the EGR line 28. The gas component reduction element may include an emission control device, and may be configured to reduce a quantity of one or more selected components from the selected amount of exhaust gases. The gas component reduction element may include, for example, a hydrocarbon retaining device, or hydrocarbon trap, or the like, and the gas component to be reduced may be one or more hydrocarbons. As a hydrocarbon retaining device, or the like, the gas component reduction element may be configured to retain, at least temporarily, at least some hydrocarbons from the selected amount of exhaust gases based on conditions, such as temperature, exhaust air-fuel ratio, exhaust hydrocarbon concentration, etc.

Under some operating conditions, such as during engine starts when the emission control device 70 is not yet to its light-off temperature (e.g., a temperature at which the device reaches a selected, sufficiently high, conversion efficiency for a particular exhaust constituent, which may include cold start operation), all or only a portion of the exhaust gas may be routed from the engine exhaust 25 to the HC retaining system 22 via the EGR line 28, with any remaining exhaust gas routed to the atmosphere via the downstream portion 34 of the exhaust passage 35. In this way, a selectively adjustable amount of the exhaust gas may be diverted from the exhaust system to the HC retaining system 22. Likewise, all or only a portion of the gasses passing through HC retaining system 22 may be routed to the engine intake, with any remaining exhaust gas routed to atmosphere. In this way, a selectively adjustable portion of the exhaust gas may be diverted from the atmosphere to the HC retaining system 22.

In one example of operation of exhaust system 7, an increased amount of cold start HC emissions may be at least partially stored and/or partially oxidized in HC retaining system 22 while the exhaust gases also heat the emission control device 70. Then, once device 70 reaches sufficient operating temperature or the HC retaining system reaches its HC storage capacity, all exhaust gases may be routed to the atmosphere through conduit 35. Also, once the emission control device 70 has reached its operating temperature or the HC retaining system reaches its HC storage capacity, the hydrocarbons retained in system 22 may be purged to the engine via engine intake 23, as described below herein.

Figure 2:
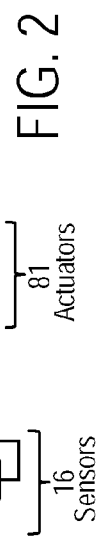
FIG. 2 shows a high level schematic depiction of a control system for an engine exhaust system.

Referring now also to FIG. 2, it shows a schematic diagram broadly illustrating the example system 6 illustrated in FIG. 1. The vehicle system 6 may further include control system 14. Control system 14 is shown receiving information from a plurality of sensors 16 (various examples of which are described herein) and sending control signals to a plurality of actuators 81 (various examples of which are described herein). The control system 14 may include a controller 12. The controller 12 may receive input data from the various sensors 16, process the input data, and trigger the actuators 81 in response to the processed input data based on instruction or code programmed therein corresponding to one or more control routines. Example control routines are described herein with regard to FIGS. 6-8.

Figure 3:
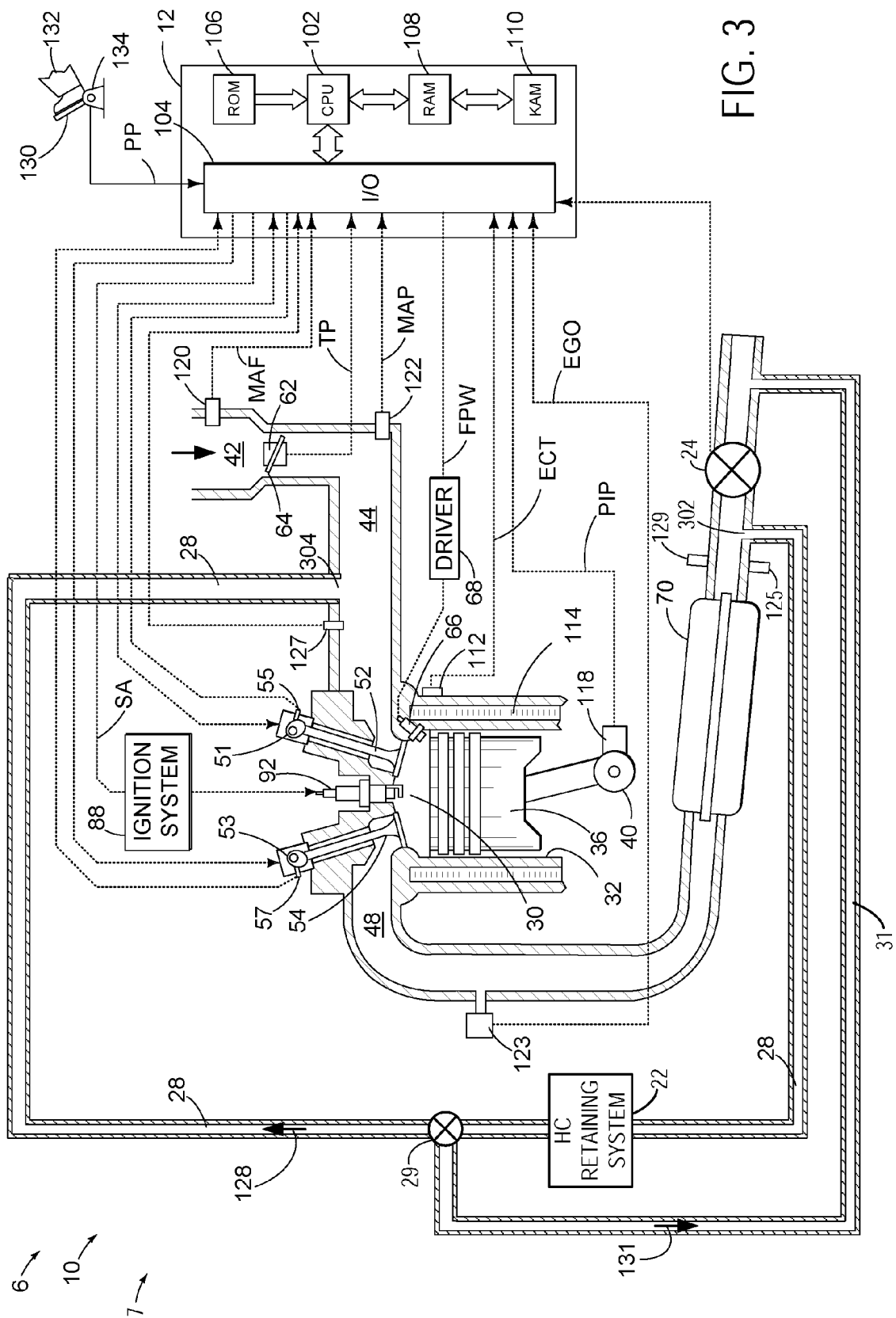
FIGS. 3-5 show schematic depictions of a portion of an engine, and various example associated exhaust systems.

As illustrated in FIG. 1, and in the additional details of FIG. 3, example, sensors 16 may include an exhaust gas sensor 123 located, for example, upstream of the emission control device 70. A temperature sensor 125, and a pressure sensor 129 may be located, for example, downstream of the emission control device 70. An EGR ratio sensor 127 may be located, for example, upstream of the combustion chambers 30, for example in the intake passage 44, and may be configured to measure a percentage, or a ratio, of re-circulated gas to an intake air. The EGR ratio sensor 127 is discussed more below. One or more other sensors may be used to gather engine conditions in addition to, or in place of, the EGR ratio sensor 127 to provide a value of the EGR ratio to the controller 12.

Other sensors such as pressure, temperature, air/fuel ratio, and composition sensors may be coupled to various locations in the vehicle system 6.

Example actuators 81, or actuated elements, may include fuel injectors 66, a first valve 24, a second valve 29, and the throttle 62. The valves may represent various example control-type valves, as well as flaps. The first valve 24, may be for example a 2-3 way valve, and may be included as part of the exhaust system 7. In some cases the first valve 24 may be positioned within conduit 35. In other cases the first valve 24 may be positioned within the opening of conduit 26. The first valve 24 may be configured to selectively route the selected amount of exhaust gases to the hydrocarbon retaining device 22, located on the EGR line 28, during a cold start condition. The first valve 24 may be further configured to a route warmed exhaust gas through the hydrocarbon retaining device 22 to purge retained hydrocarbons from the hydrocarbon retaining device 22.

Actuation of the first valve 24 may depend on one or more engine conditions, such as a temperature of the exhaust gas, a temperature of the emission control device 70, an estimated or measured HC loading of the HC retaining device, and/or whether or not a cold start condition exists with the engine 10. The conditions may be monitored by the one or more sensors 16 discussed earlier. Actuation of the first valve 24 may be effected by a signal from the controller 12.

The system 7 may be configured such that the valve 24 may direct a first quantity 126 of the exhaust to the gas component reduction element 22 via conduit 26, or via bypass 27, and a second quantity 135 to the atmosphere through valve 24 and conduit 35 in coordination with various operating conditions of the gas component reduction element 22. For example, if the gas component reduction element 22 is approaching a maximum loading during a storing phase, the system 7 may direct relatively less exhaust gas to it. As another example, if the exhaust gas is warming up, the system 7 may direct less exhaust gas to the gas component reduction element 22. In this way, early release of hydrocarbons may be reduced. As still another example, an additional emission control device (not shown) may be located downstream of valve 24. In which case, the system 7 may adjust how much exhaust is directed to the EGR line 28 based on the temperature of the second emission control device.

Additionally, a valve located in the exhaust and downstream of the EGR line, such as valve 24, may also be adjusted to generate backpressure to assist in the purging of the gas component reduction element 22. For example, during hydrocarbon purging operation when vacuum in the intake manifold is less than a threshold amount, or when manifold pressure is greater than the exhaust pressure, the valve 24 may adjustably restrict flow through the exhaust passage 35 thereby adjusting (e.g., increasing) exhaust pressure and adjusting (e.g. increasing) or enabling purging flow through passage 28. As such, hydrocarbons may be purged without manifold vacuum and/or with reduced manifold vacuum, such as during unthrottled conditions where throttle plate 62 is substantially wide-open. Further the amount of purging may be adjusted by varying an amount of the restriction and thus an amount of backpressure.

The exhaust system 7 may also include a treated exhaust line 31 coupled with the EGR line 28. The exhaust system 7 may be configured to allow a first portion 128 of the selected amount of the exhaust gases from the gas component reduction element 22 to pass into the intake passage 44 of the engine 10, and also configured to route a second portion 131 of the selected amount of the exhaust gases to atmosphere. In this way, various example embodiments may reduce the directing of excessive re-circulated gas into the combustion chamber 30 so that degraded engine performance, such as misfiring, for example, may be reduced. An excessive re-circulated gas condition may by reflected in the EGR ratio, as measure by the one or more sensors 16, which may include the EGR ratio sensor 127. In addition to misfiring, when the EGR ratio is outside a preselected range, increased emissions, such as hydrocarbons (HC), may be generated.

The second valve 29 may be configured to selectively control relative amounts of the first portion 128 of the selected amount of exhaust gases sent to the intake passage 44, and the second portion 131 of the selected amount of exhaust gases sent to the atmosphere, in accordance with at least one selected engine condition. The at least one selected engine condition may include the EGR ratio. When the EGR ratio is above a certain threshold the second valve 29 may be actuated to direct all, or a portion of, the re-circulated gas to atmosphere via the treated exhaust line 31. The actuation of the second valve 29 may be effected by a signal from the controller 12. The actuation of second valve 29 may be in response to engine combustion stability. For example, if the engine stability drops, as determined, for example, by a drop in engine speed or variation in engine speed, then the second valve 29 may be actuated to increase the amount of EGR gases going to atmosphere via treated exhaust line 31 (and thus reduce the amount to the intake manifold) Further, valve 29 may be adjusted responsive to temperature of retaining system 22, in that increased flow to the intake manifold may be provided as the temperature of the retaining system 22 reaches above a threshold value. Additionally, or alternatively, valve 29 may be adjusted responsive to a measured humidity or HC concentration. In still another embodiment, valve 29 may be a single input and single output valve located in line 28, and an additional shut-off valve (not shown) may be placed in line 131, where these alternative valves can also be adjusted and controlled as indicated above with regard to valve 29.

Other engine operating conditions may also, or instead, be used as an input to control the relative amounts of the first portion 128 and the second portion 131 of the exhaust gases, directed respectively to the intake passage and to atmosphere. The other engine operating conditions may include concentrations of various gases detected in the exhaust stream, temperature of the exhaust gas, and pressure of the exhaust gas. These values may be measured by, for example, the exhaust gas sensor 123, temperature sensor 125, or pressure sensor 129.

In some examples, locating the gas component reduction element 22 on the EGR line may thermally decouple the gas component reduction element 22 from the exhaust system. In this way, the selected amount of exhaust gases may be allowed to cool during a cold start condition which may allow the one or more selected components to condense. The EGR line 28 may be further configured to receive a warmed exhaust gas during a warmed engine condition to cause the one or more selected components to evaporate and to pass with the warmed exhaust gas through the intake passage 44 to be burned by the engine 10. In other examples, such as for example, when the gas component reduction element 22 is a hydrocarbon trap, hydrocarbons may be stored during cold start conditions by selective control of flow through a cooler (see below), even if the exhaust temperature rises above a desorption temperature of system 22, but yet is still below a light-off temperature of device 70. Then when the emission control device 70 is properly lit off, the stored hydrocarbons may be purged using cleaned exhaust gas.

A cooler 150 may be located on the by-pass 27 in selective fluid communication with the conduit 26. The cooler may be located upstream or downstream of the gas component reduction element. A valve 152 may be configured to selectively direct the EGR flow to the conduit 26, or to the bypass 27. The relative quantities of flow may be adjusted in continuous fashion, or substantially the whole flow may be directed to one, while to the other there is substantially no flow. Under extended first operating mode, for example, other than during a cold start, the EGR flow may be directed to the cooler 150 to cool the EGR flow before passing to the intake manifold 44 (e.g., increased flow to the cooler). During lead up to, and/or during, the purging phase the EGR flow may pass through conduit 26 without being cooled by the cooler 150 (e.g., reduced flow to the cooler). In this way, the exhaust gas may be at a sufficiently high purging temperature for the purging phase. Also in this way, a better purge/release of stored hydrocarbons may be achieved, in that the cooler 150 may keep the gas component reduction element 22 relatively cool during cold starting so that the trapping ability of the HC trap may be held relatively high for a longer duration of the cold start.

Note that the control system may route EGR to the cooler during warmed-up engine boosted conditions, where engine 10 includes a turbocharger, to provide cooled EGR to the engine and reduce a potential for engine knock. For example, valve 152 may be adjusted responsive to engine knock to increase EGR flow to the cooler.

Continuing with FIG. 3, FIG. 3 schematically illustrates one cylinder of multi-cylinder engine 10. Dashed lines have been used to illustrate various components which may be coupled with controller 12. The engine 10 may be controlled at least partially by the control system including controller 12, as well as by input from a vehicle operator 132 via an input device 130. In this example, input device 130 includes an accelerator pedal and a pedal position sensor 134 for generating a proportional pedal position signal PP. Combustion chamber or cylinder 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust manifold 48. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

While this example shows the EGR line 28 entering the intake flow downstream of the throttle to enable manifold vacuum to draw in the gases, various other configurations may also be used. For example, in the case of a turbocharged engine, purge line(s) may lead to upstream of the turbocharger compressor inlet.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52, and/or exhaust valve 54, may be controlled by electric valve actuation. For example, cylinder 30 may alternatively include an intake valve controlled via electric valve actuation, and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively, or additionally, include a fuel injector arranged in intake passage 44 in a configuration that provides what is known as port injection of fuel into the intake port upstream of combustion chamber 30.

Intake passage 42 may include throttle 62 having a throttle plate 64. In this particular example, the position of throttle plate 64 may be varied by controller 12 via a throttle position signal TP provided to an electric motor or actuator included with throttle 62, a configuration that is commonly referred to as electronic throttle control (ETC). In this manner, throttle 62 may be operated to vary the intake air provided to combustion chamber 30 among other engine cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 123 is shown coupled to exhaust passage 48 upstream of emission control device 70. Sensor 123 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 may be a three-way catalyst (TWC), NOx trap, various other emission control devices, or combinations thereof. In some embodiments, during operation of engine 10, emission control device 70 may be periodically reset by operating at least one cylinder of the engine 10 within a particular air/fuel ratio.

Controller 12 is shown in FIG. 3 as a microcomputer, including microprocessor unit 102, input/output ports 104, an electronic storage medium for executable programs and calibration values shown as read only memory chip 106 in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF); engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal (MAP) from sensor 122. Engine speed signal, RPM, may be generated by controller 12 from signal PIP. Manifold pressure signal MAP from a manifold pressure sensor may be used to provide an indication of vacuum, or pressure, in the intake manifold.

As described above, FIG. 3 shows only one cylinder of a multi-cylinder engine 10, however each cylinder may similarly include its own set of intake/exhaust valves, fuel injector, spark plug, etc.

The exhaust system 7, according to the present disclosure, may be configured in various ways. Various examples are illustrated in the figures. For example FIG. 3 shows the EGR line 28 having an inlet 302 downstream of the emission control device 70, and an outlet 304 in fluid communication with the intake passage 44 downstream from the throttle 62. Other arrangements are possible.

Figure 4:
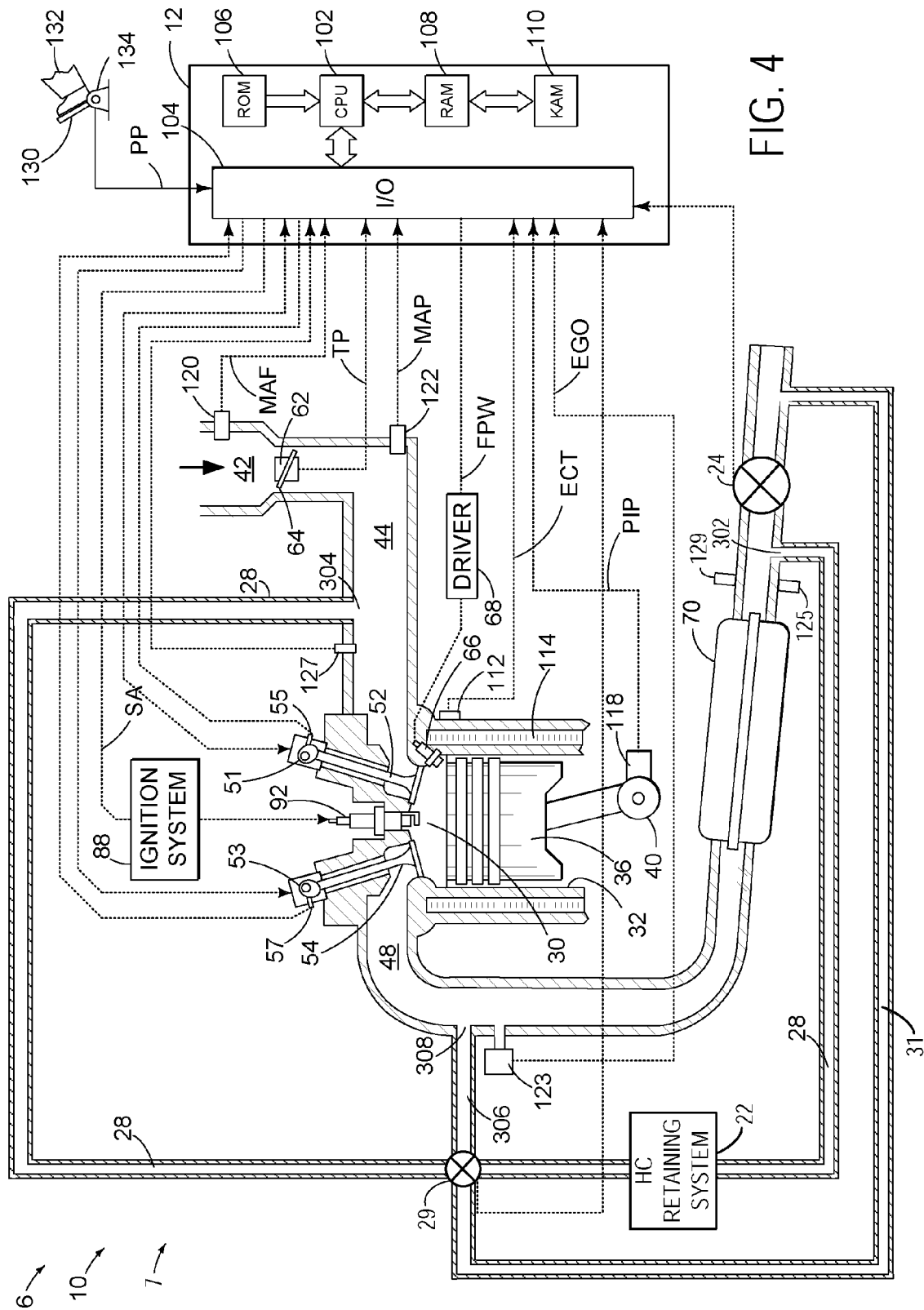

FIG. 4 illustrates an EGR line 28 having a first inlet 302 downstream of the emission control device 70, and an outlet 304 in fluid communication with the intake passage 44. The example illustrated also includes an additional EGR passage 306 having a second inlet 308 upstream from the emission control device. In this way all, or a portion, of the exhaust gas from exhaust passage 48 may be directed to the intake passage 44 without passing first through the emission control device 70. Also illustrated in this example, the gas component reduction element 22 is disposed on the EGR line 28 downstream from the additional EGR passage 306 and the second inlet 308.

Figure 5:
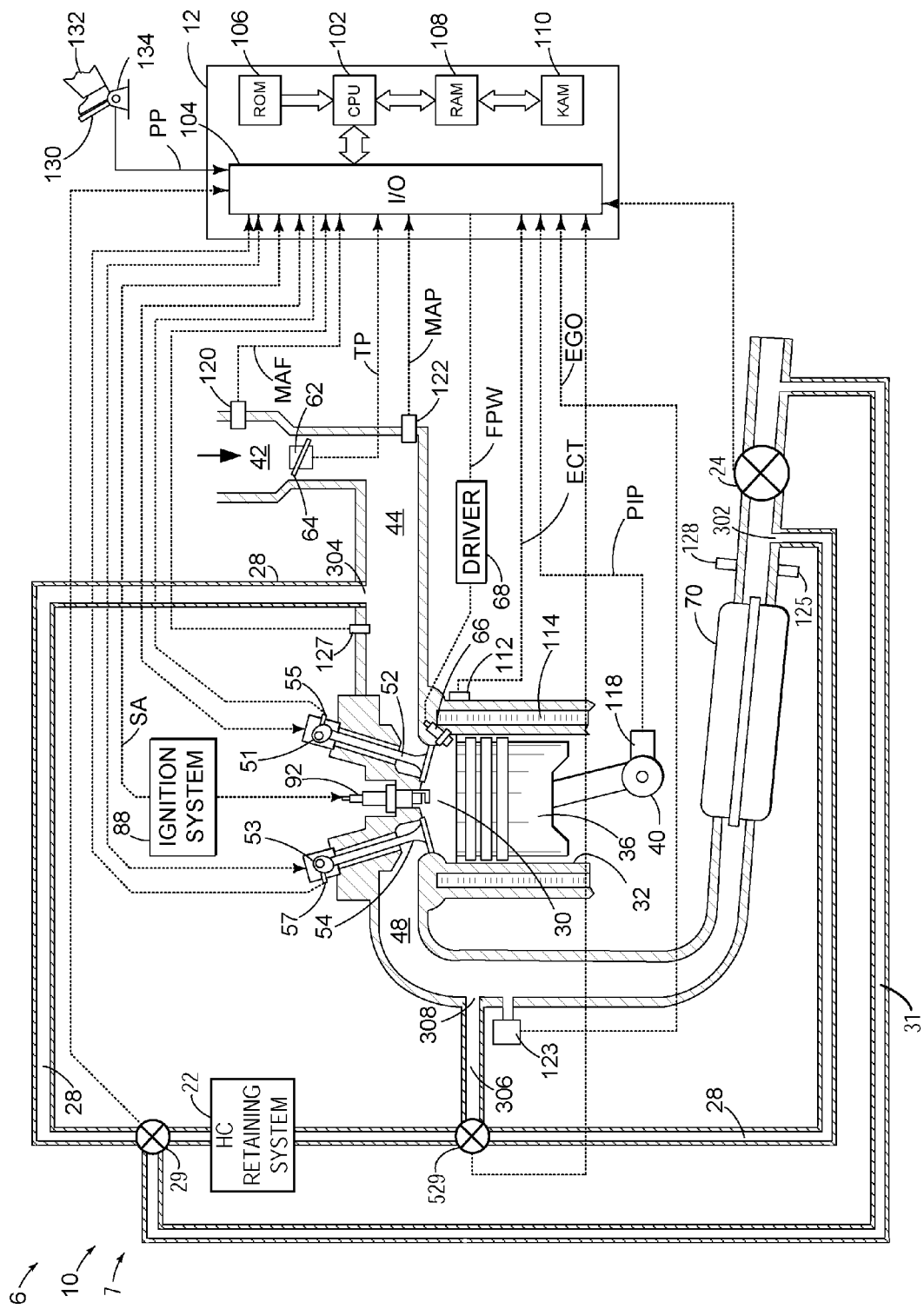

FIG. 5 illustrates another example exhaust configuration 7. In this example the gas component reduction element 22 may be upstream from the additional EGR passage 306, and the second inlet 308. In this way, the gas component reduction element 22 may be purged with exhaust gases directed directly from the exhaust passage 48 via the additional EGR passage 306.

Figure 6:
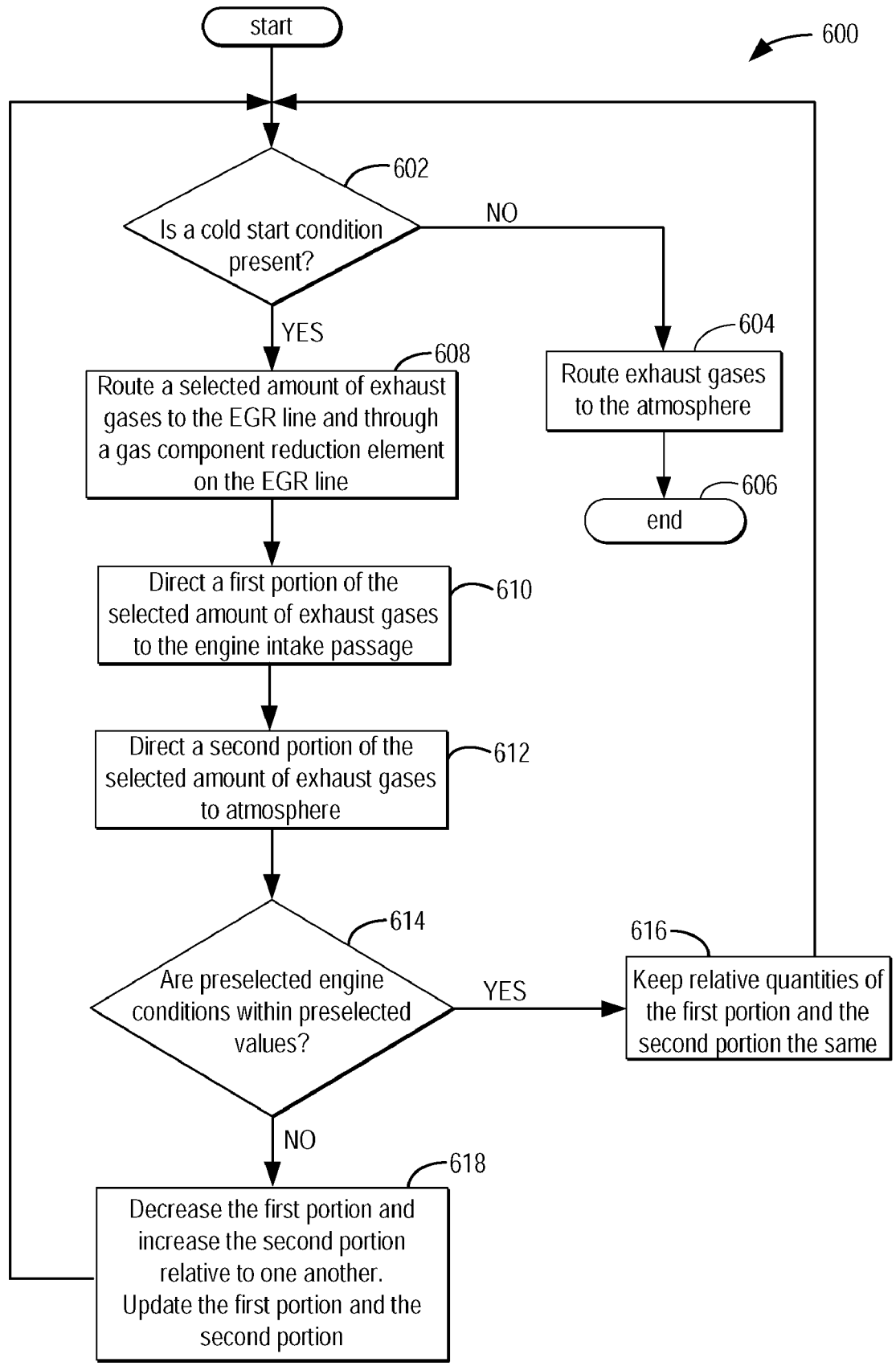
FIGS. 6-8 show high level flow charts illustrating routines that may be implemented for managing exhaust during a cold start condition of an internal combustion engine.

Referring now to FIG. 6, an example method, or routine 600, of operating an engine is shown. The routine 600 may be used for exhaust emission management, specifically for reducing an amount of one or more gaseous components from the exhaust stream of the internal combustion engine. The method may be implemented while an emission control device is below an activation (e.g., light-off) temperature, and therefore, less likely to remove some of the preselected gaseous components. Routine 600 may operate during a cold-start condition, re-start condition or a warm-up condition, such as while the engine or exhaust warms from ambient temperatures to within a more effective operating temperature range. Routine 600 may be implemented using systems, components, and devices described herein, but alternatively may be implemented using other suitable systems, components, and devices.

First, at 602, the routine illustrated determines whether or not a cold start condition is present, and/or when the temperature of the emission control device 70 is below a threshold temperature. In some cases a cold start condition may be detected if the engine is being started from rest and component temperatures have equilibrated to ambient conditions. Additionally, or optionally, the routine may determine whether the engine has been started via an engine cranking operation.

Then, at 604, if a cold start condition is not present, or no longer present, then exhaust gases may be routed to atmosphere, and the routine may end at 606. In some examples, exhaust gases may be routed to the EGR line after operation 604, or after operation 602 when a cold start condition is not present, at various times, including during EGR operation where EGR is controlled responsive to engine speed and load, for example. On the other hand, if a cold start condition start is present, as determined at 602, the routine may continue, at 608, to route exhaust gas from the engine to a gas component reduction element, for example a hydrocarbon retaining system, located on an EGR line, to store hydrocarbons in the hydrocarbon retaining system. Continuing, at 610, the routine 600 may continue by directing a first portion of the exhaust gas from the hydrocarbon retaining system to an intake passage. The routine 600 may also continue, at 612, by directing a second portion of the exhaust gas from the hydrocarbon retaining system to atmosphere. The directing a second portion of the exhaust gas from the hydrocarbon retaining system to atmosphere may be facilitated by coupling a treated exhaust line with the EGR line downstream from the hydrocarbon retaining system.

Then, at 614, the routine 600 may determine whether, or not, one or more preselected engine conditions are within preselected values. If the preselected engine conditions are within the preselected values, then the relative quantities of the first portion and the second portion may be kept the same, as shown at 616. The routine 600 may then loop back to decision box 602 to re-determine whether, or not, a cold start condition is present, and may then continue as described. This may occur at preselected intervals. On the other hand, if the preselected engine conditions are outside the predetermined values, then at 618, the first portion may be decreased, and the second portion may be increased, relative to one another. Also, the relative values of the first portion and the second portion may be updated by predetermined amounts, for the purposes of implementing the routine 600, and the routine may loop back up to decision box 602, and continue as described. Further, if a cold start condition persists, the routine 600 may continue with the updated values of the first and second portions, until a cold start condition no longer persists. In this way, degraded performance of the engine, due to excess re-circulated air, may be reduced while capturing gaseous components, such as hydrocarbons, and while other components, such as a catalyst, may be below an effective temperature.

In some examples, when the cold start condition no longer persists, for example when the exhaust is at a temperature greater than a predetermined temperature, the hydrocarbon retaining system may be purged by directing exhaust, from the exhaust passage, through the hydrocarbon retaining system.

In various example embodiments, the relative portions may be controlled at least partially by a first valve operatively disposed in an exhaust passage, such as valve 24. The first valve may be configured for selectively routing the exhaust gas from the engine to the hydrocarbon retaining system depending on one or both of a temperature of the exhaust, and an amount of time from an engine off condition.

Various example embodiments may also, or instead, include a second valve operatively disposed on the EGR line, such as valve 29. The second valve may be configured for selectively regulating the relative quantities of the first portion of the exhaust gas, and the second portion of the exhaust gas. In some examples, such as those described above in reference to FIG. 6, the second valve may be configured to regulate the relative amounts of the first portion 128 and the second portion 131 of the selected amount of the exhaust gas by varying amounts. In other examples, the second valve may have only two states. In a first state all of the selected amount of exhaust gases may be passed to the inlet passage, and in a second state all of the selected amount of exhaust gases may be passed to the atmosphere.

Figure 7:
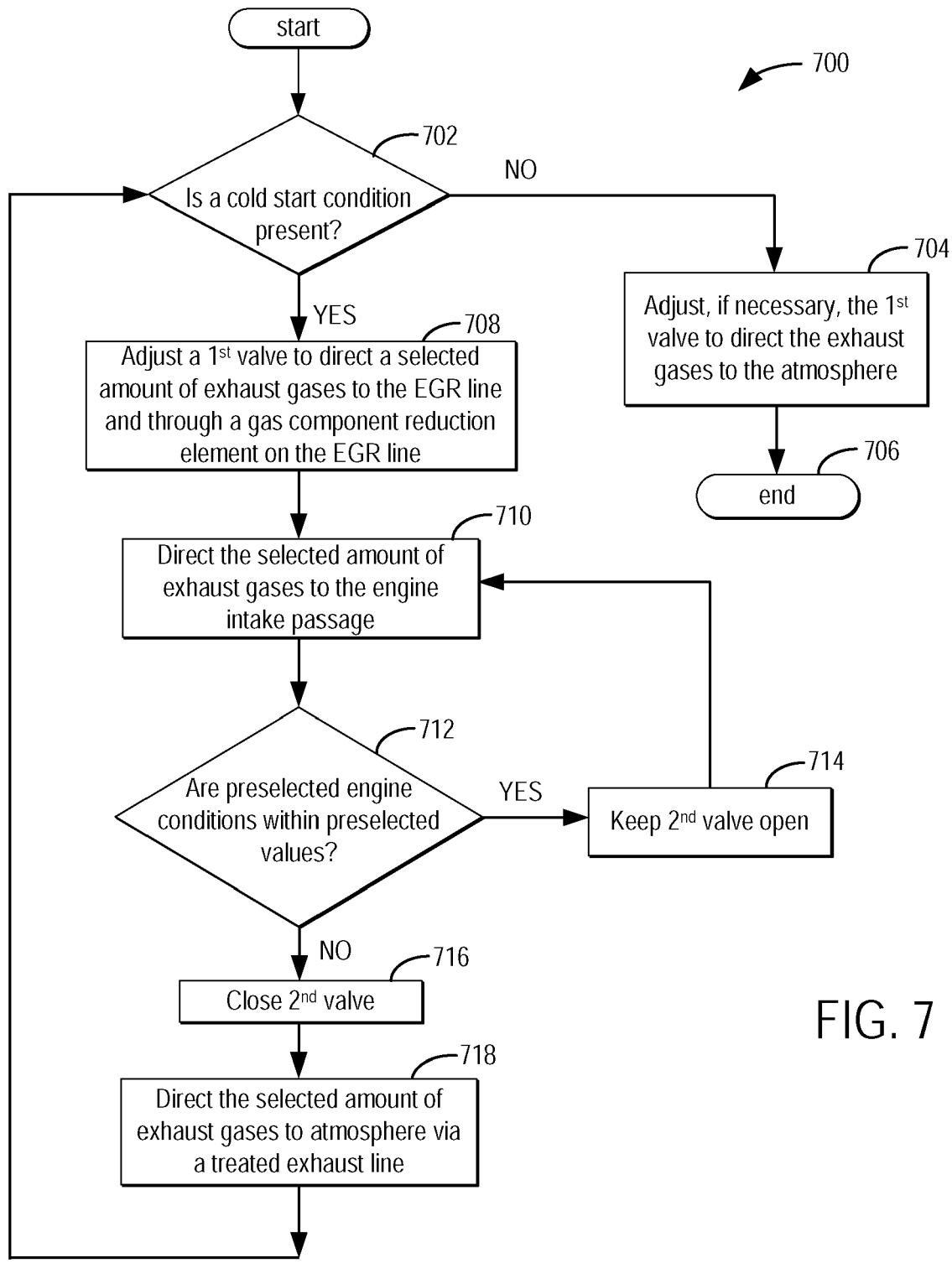

FIG. 7 is a flow chart illustrating another example method 700, or routine, that may be used for exhaust emission management. The method 700 may include, at 702, a determination of whether, or not, a cold start condition is present. If a cold start condition is not present then the routine may, at 704 adjust, if desired a first valve to direct the exhaust gases to the atmosphere. The routine 700, may then end at 706. As described above in reference to FIG. 6, similarly, in some examples, exhaust gases may be routed to the EGR line after operation 704, or after operation 702 when a cold start condition is not present, at various times, including during EGR operation. However, as determined at 702, if a cold start condition is present, the routine 700 may continue, at 708, by adjusting a first valve to direct a selected amount of exhaust gases to an EGR line and through a gas component reduction element on the EGR line. The routine 700 may continue, at 710, by directing the selected amount of exhaust gases to the engine intake passage. Then, at 712, the routine 700 may determine whether, or not, one or more preselected engine conditions are within preselected values. If the preselected engine conditions are within the preselected values, as shown at 714, a second valve may be kept open. The routine 700 may then loop back to 710, and continue to direct the selected amount of exhaust gases to the engine intake passage. If, on the other hand, if the preselected engine conditions are outside the preselected values, then at 716, the second valve may be closed, and at 718 the selected amount of exhaust gases may be directed to atmosphere via a treated exhaust line. The routine 700 may then loop back up to decision box 702 and continue as described.

In addition, in some examples, that may be similar to, or the same, as that described above with regard to the routine 600 shown in FIG. 6, the routine 700 may continue, and may purge the gas component reduction element when the cold start condition is no longer present. This may occur when the exhaust gas is sufficiently warm, by directing warmed exhaust gas to the intake passage, and/or to atmosphere, via the EGR line.

Figure 8:
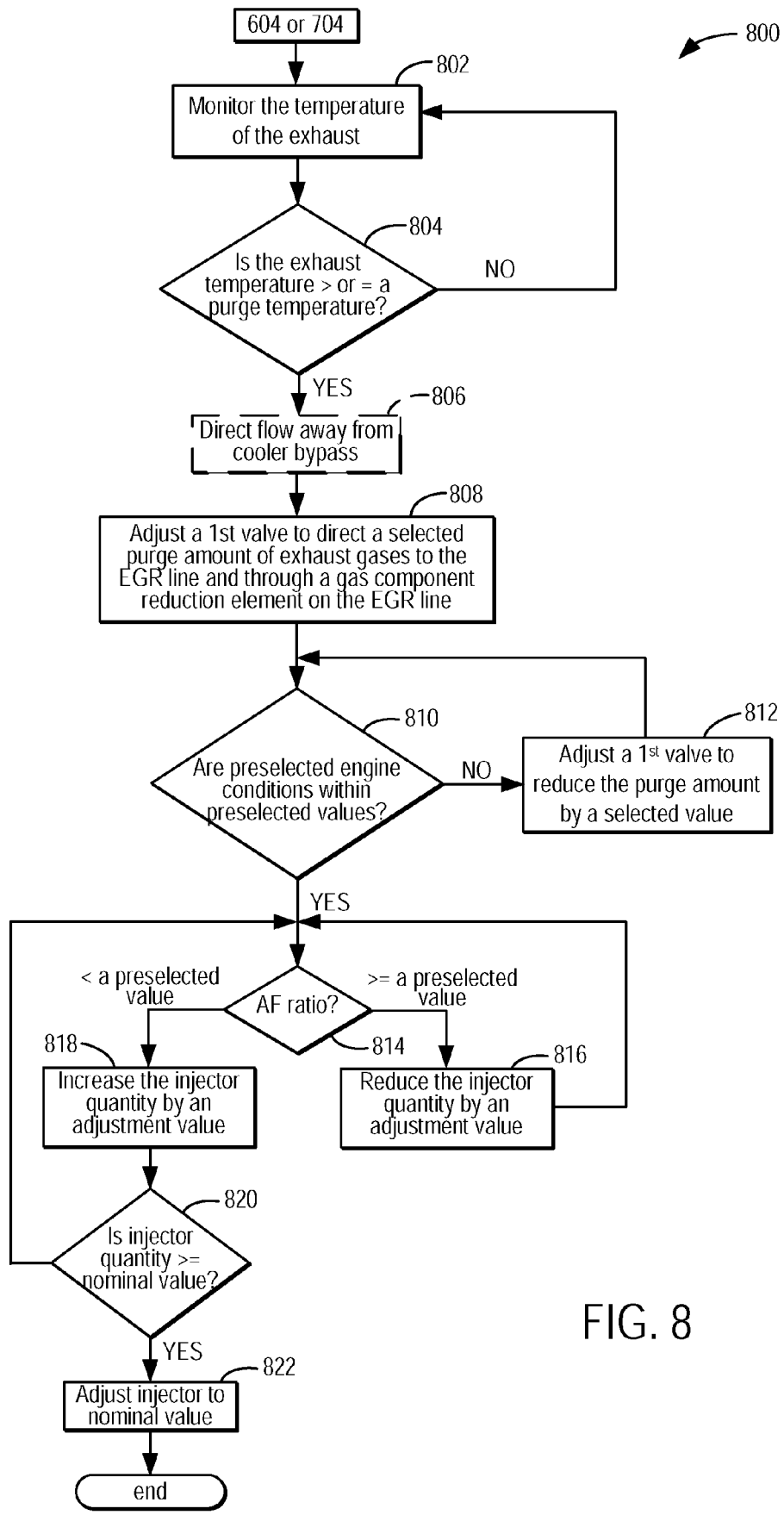

FIG. 8 is a flow chart illustrating one example method 800, or routine to purge the gas component reduction element 22. The method 800 may be included as part of an exhaust emission management technique in accordance with the current disclosure. The method 800 may continue from, for example, operation 604 in FIG. 6, or operation 704 in FIG. 7, and may define a purging phase. In some examples, the purging phase may begin when the exhaust temperature reaches a predetermined minimum temperature, which may be referred to as a purge temperature. In other examples the purging phase may begin after the gas component reduction element 22 reaches a predetermined level of saturation. The level of saturation may be measured, for example, by measuring a concentration of a particular component of the exhaust gas, such as hydrocarbons, downstream from the gas component reduction element 22. Other methods of determining the saturation level may be used.

FIG. 8 illustrates an example wherein the temperature of the exhaust is monitored, at 802. Then, as illustrated with decision box 804, the method may determine if the exhaust temperature is greater than or equal to the purge temperature. If not, the method may return to 802 and continue to monitor the temperature of the exhaust. The monitoring may be continuous, or may be made at predetermined increments. If the exhaust is determined to be greater than or equal to the purge temperature, then in some cases, as show as 806, the exhaust flow may be directed away from the cooler 150 on the bypass 27 (FIG. 1). This may be accomplished by adjusting valve 152. Other examples may not include this operation. Then continuing at 808, a purge flow amount of exhaust may be directed to the gas component reduction element 22. This may be done by, for example, adjusting the first valve 24. In this way, the gas component reduction element 22 may be kept relatively cool, with the cooler 150, to improve the absorption of the gas component reduction element 22 before the purging cycle begins, and to improve desorption of the gas component reduction element 22, by using exhaust gas not actively cooled by the cooler 150, once the purging cycle begins.

The method 800 may continue, at 810, with another decision box to determine if the engine conditions are within one or more preselected values. If not, the method may, at 812, reduce the purge flow amount, by, for example, adjusting the first valve 29. In this way, the engine performance may be corrected if the quantity of the purge flow creates adverse engine performance. However, if the engine conditions are within the one or more preselected values the method 800 may continue, at 814, by determining the value of the air-fuel ratio in the combustion chamber 30. If the AF ratio is greater than, or equal to a first preselected value then, at 816 the method may reduce the fuel injector flow quantity. In this way, the gases, such as hydrocarbons, desorbed from gas component reduction element 22, and thereby increasing the fuel content of the AF mixture, may be balanced by reducing the injected fuel component of the AF mixture. The routine 800 may then loop back up to decision box 814 to continue to monitor, and make a determination about the AF ratio.

On the other hand, if the AF ratio if less than a second preselected value the method 800 may continue, at 818, by increasing the fuel injector flow quantity. In this way a reduction of the total desorbed quantity of gases from the from gas component reduction element 22 may be balanced by increasing the injected fuel component of the AF mixture. Over time the injector quantity may be adjusted back toward a nominal, or original, value. The first preselected value and the second preselected value may be the same, or differing values. The differing values may define a tolerance band wherein the injector values may not be adjusted when within it.

Then, at 820, the method 800, may verify if the injector flow value is set, or reset, by repeated adjustments, to a predetermined nominal, or original, value. In this way the method 800 may be configured to determine if the purging cycle is substantially complete. In other cases, the completion of the purging cycle may be determined in other ways, such as with direct application of the measured AF ratio value, or after a predetermined duration, or other technique. Then, to assure the gradually adjusted value has not been over adjusted, the method may, more definitely, at 822, adjust the injector value to the nominal value.

In some examples, the decision operations 810 and 814, and the associated operations, may be reversed. In other examples, one or the other operation of operations 810 and 814 may not be included in the method 800.

Other engine systems may also be adjusted with various control routines. For example, the spark timing of the engine may be advanced when increased EGR quantities are directed to the intake manifold.

Figure 9:
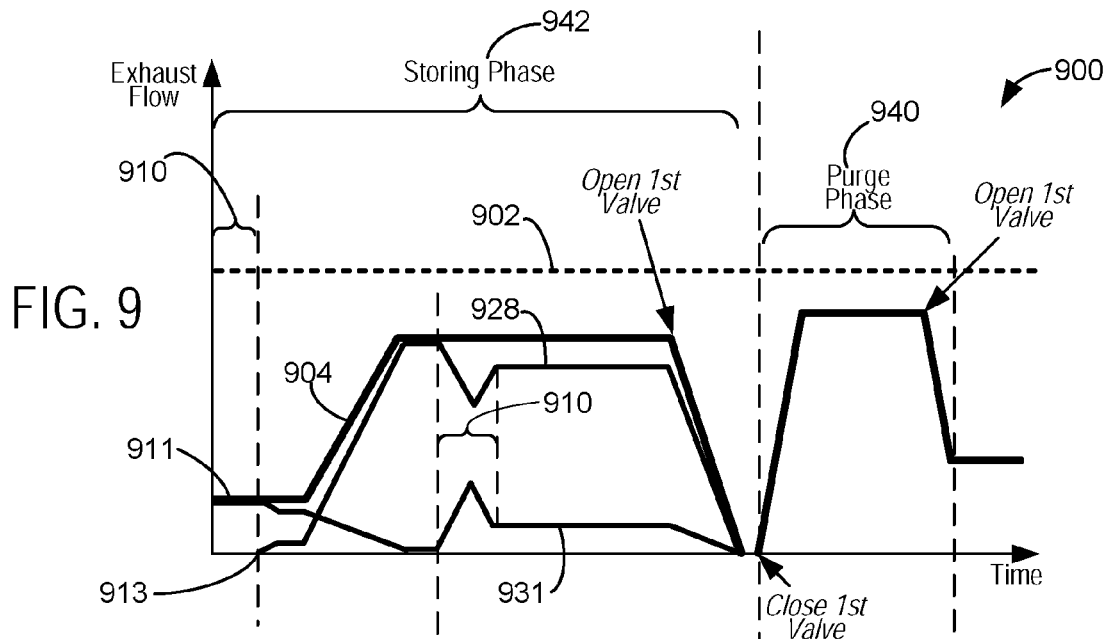
FIG. 9 is a graph illustrating relative exhaust flows over time in an engine exhaust system for an internal combustion engine.

Referring now to FIG. 1 and to FIG. 9, FIG. 9 is a graph 900 illustrating example exhaust flow quantities in an engine system such as the engine system 8 illustrated in FIG. 1. The flow quantities may be varied by, for example, adjusting the first valve 24, and the second valve 29 shown in FIG. 1. Other configurations may also be used to achieve the example flow quantities. A total exhaust flow 902 from the engine 10 exhaust manifold 48 is illustrated with a dashed line as a constant quantity for simplicity. In many cases, the total exhaust flow 902 may vary over time. A total EGR flow 904, (i.e. the selected amount of exhaust gases 126 as termed herein) is illustrated below the total exhaust flow 902 with a thick solid line to illustrate a portion of the total exhaust flow 902 that may be directed by valve 24 to pass into conduit 26, and through the gas component reduction element 22. The total EGR flow 904 may be a variable quantity, as indicated, and may be adjusted according to various engine events, and engine operating periods. The area under the total exhaust flow 902 line, and above the total EGR flow line 904, may represent a quantity of exhaust to pass directly to the atmosphere, from the engine 10. In some cases, during some periods of engine operation, the flow directly to the atmosphere may be reduced to substantially zero.

A first portion curve 928 and a second portion curve 931 are also shown in the graph 900 under the total EGR flow line 904 to illustrate, respectively, the first portion 128 of the selected amount of exhaust gasses to pass into the intake passage via EGR line 28, and the second portion 131 of the selected amount of exhaust gasses to pass to the atmosphere via treated exhaust line 31 (FIG. 1). The graph 900 illustrates, with curves 928 and 931, the first portion 128 and the second portion 131 flows as complementary quantities of flow that together may make up the total EGR flow 904. The graph shows small spaces between some adjacent lines for clarity. It will be understood that in some cases these flow values may be the same.

The exhaust flows may be varied by adjusting first valve 24, and second valve 29, as discussed, based on one or more engine events, and/or during one or more engine operating periods. In one example, during engine run-up 910, the total EGR flow 904 may be started at predetermined low flow rate by adjusting the first valve 24, and adjusting the second valve 29 to direct a run-up flow 911 through the gas component reduction element 22. The second valve 29 may adjusted to direct all the run-up flow 911 to the atmosphere to keep the total EGR flow to the intake manifold 44 to substantially zero during this time. The duration of the engine run-up 910 may be based on, for example, a predetermined number of combustion events, for example the first four combustion events, or during cold idling (e.g., catalyst heating). Then, once the engine speed reaches a predetermined speed, for example 800 RPM, some EGR flow may be started by partially opening valve 24 at time 913. Initially, a relatively small amount of flow may be directed to the engine intake 44. Then the quantity of EGR flow, i.e. the second portion 131 may be increased until, for example, a predetermined EGR ratio is reached.

Figure 10:
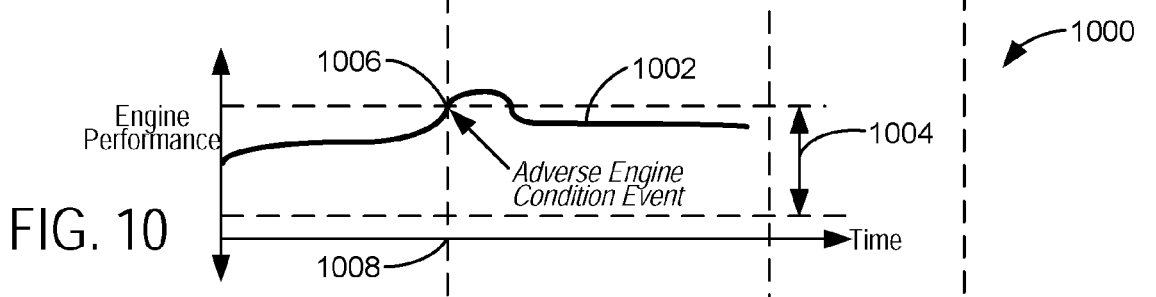
FIG. 10 is a graph illustrating an example engine operating condition over the same time frame illustrated in FIG. 9.

FIG. 10 is a graph 1000 schematically illustrating example engine performance over time with curve 1002, relative to a preselected operating range 1004. The graphs in FIG. 9 and FIG. 10 represent the same time frame. An example adverse engine condition event 1006 is shown at time 1008 where the engine performance moves out of the preselected operating range 1004. In order to bring the engine performance back into the preselected operating range 1004 one or more adjustment may be made, and/or one or more mitigating routines may be performed, in accordance with the present disclosure. An example adjustment 910 is illustrated showing with respective curves 928 and 931, wherein the first flow 128 may be decreased, and the second flow 131 increased a corresponding amount. In this way, various components, such as hydrocarbons may be captured and stored in the gas component reduction element 22 while still maintaining predetermined engine conditions.

Figure 11:
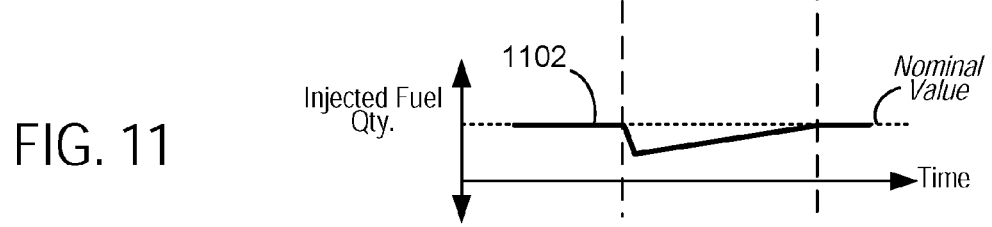
FIG. 11 is a graph illustrating an example adjustment routine that may be performed during a purging phase illustrated in FIG. 9.

FIG. 9 also illustrates an example purging phase in accordance with the present disclosure. In some examples, purging phase 940 may immediately follow a storing phase 942, when the exhaust is above a purge temperature. In some examples, various control routines may be implemented to provide improved engine performance. For example, in addition to, or instead of, adjusting the first valve 24, and/or the second valve 29, the fuel quantity injected by the fuel injectors may be adjusted as described herein. FIG. 11 is a graph 1100 schematically illustrating an example fuel quantity 1102 injected into a cylinder 30 of the engine 10. In this example, the fuel quantity 1102 may be reduced at the start of the purging phase 840 to allow for the hydrocarbons that may be release from the gas component reduction element 22, and thereby added to the air-fuel mixture to be combusted in the cylinders.

Another example method may include providing an EGR line to pass a selected amount of exhaust from an exhaust passage of the engine to an intake passage of the engine, the EGR line may be coupled to the exhaust passage downstream from an emission control device. The method may continue by positioning a hydrocarbon retainer on the EGR line to absorb hydrocarbons in an exhaust from the engine, at least during a cold start condition. The method may also include providing a first flow directing element to direct the selected amount of exhaust to the EGR line. The method may also include providing a treated exhaust line from the EGR line upstream of the hydrocarbon retainer to atmosphere. The method may also include providing a second flow directing element on the EGR line to selectively direct a first portion of the exhaust to the intake passage, a second portion of the exhaust to the atmosphere.

In some examples the method may include providing one or more engine condition sensors to sense one or more engine conditions. The method may also include providing a control system to control the second flow directing element to control relative amounts of the first portion of the exhaust to the intake passage, and the second portion of the exhaust to the atmosphere based on engine conditions as sensed by the one or more engine condition sensors.

In some examples the method may include providing a temperature sensor to sense a temperature of an exhaust stream in the exhaust passage, and providing a control system to control the first flow directing element.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The invention claimed is:

1. An internal combustion engine exhaust system, comprising:
   an EGR line routing a selected amount of exhaust gases from an exhaust passage of an engine toward an intake passage of the engine, the EGR line including a first inlet located downstream of an emission control device and a second inlet located upstream of the emission control device;
   a gas component reduction element in the EGR line reducing a quantity of one or more selected components from the selected amount of exhaust gases and located downstream of the second inlet; and
   an exhaust line coupled with the EGR line and coupled to route a first portion of the selected amount of the exhaust gases to pass into the intake passage of the engine, and to route a second portion of the selected amount of the exhaust gases from the gas component reduction element to atmosphere while the first portion is routed into the intake passage.

2. The internal combustion engine exhaust system of claim 1, further comprising an EGR proportion valve that selectively controls relative amounts of the first portion of the selected amount of exhaust gases to the intake passage and the second portion to the atmosphere in accordance with at least one selected engine condition.

3. The internal combustion engine exhaust system of claim 1, further comprising an EGR cooler coupled in the EGR line upstream of the gas component reduction element.

4. The internal combustion engine exhaust system of claim 3, wherein the gas component reduction element is a hydrocarbon retaining device that at least partially retains, at least temporarily, at least some hydrocarbons from the selected amount of exhaust gases.

5. The internal combustion engine exhaust system of claim 1, wherein the EGR line has is coupled to a treated exhaust line downstream of the gas component reduction element, and where a valve is positioned between a passage leading from the second inlet and the treated exhaust line.

6. A method of operating an engine comprising:
   routing exhaust gas from the engine to a hydrocarbon retaining system located on an EGR line before an emission device reaches a threshold temperature;
   directing a first portion of the exhaust gas from the hydrocarbon retaining system to an engine air intake passage; and
   directing a second portion of the exhaust gas from the hydrocarbon retaining system to atmosphere.

7. The method of claim 6, wherein a first valve is operatively disposed on an exhaust passage, the method further comprising selectively routing the exhaust gas from the engine to the hydrocarbon retaining system via the first valve depending on one or both of a temperature of the exhaust gas, and an amount of time from an engine off condition.

8. The method of claim 7, further comprising purging the hydrocarbon retaining system by directing exhaust, from the exhaust passage, when the exhaust is at a temperature greater than a predetermined temperature through the hydrocarbon retaining system.

9. The method of claim 6, wherein a second valve is operatively located on the EGR line downstream of the hydrocarbon retaining system, the method further comprising selectively regulating relative quantities of the first portion of the exhaust gas, and the second portion of the exhaust gas, via the second valve.

10. The method of claim 6, wherein a treated exhaust line is coupled with the EGR line downstream from the hydrocarbon retaining system, the method further comprising directing the second portion of the exhaust gas from the hydrocarbon retaining system to the atmosphere via the treated exhaust line.

11. The method of claim 6, further comprising:
cooling the exhaust gas before entering the hydrocarbon retaining system; and
subsequently routing a non-cooled exhaust gas during a warmed engine condition to the hydrocarbon retaining system and then to the engine air intake passage.

12. The method of claim 6, wherein an emission control device is located on an exhaust passage upstream from an inlet to the EGR line, and wherein the routing the exhaust gas to the hydrocarbon retaining system is adjusted depending on one or more of a temperature, humidity, species concentration of the exhaust gas, temperature of the emission control device, and a HC-loading level of the hydrocarbon retaining system.

13. The method of claim 12, wherein the routing the exhaust gas to the hydrocarbon retaining system includes a run-up phase wherein a total EGR flow to the hydrocarbon retaining system is started at a predetermined relatively low flow rate, and wherein the first portion directed to the engine air intake passage is substantially zero, and wherein the second portion is substantially equal to the relatively low flow rate; and
after the run-up phase the total EGR flow is increased, and the first portion directed to the engine air intake passage is increased and the relative amounts of the first portion and the second portion are adjusted until a predetermined EGR ratio directed to the engine air intake passage is reached.

14. The method of claim 13, wherein the duration of the run-up phase is based on a predetermined number of combustion events or until the emission control device is lit-off.

15. The method of claim 6, further comprising:
monitoring a temperature of the exhaust gas upstream from the hydrocarbon retaining system and upstream from a cooler;
directing the exhaust gas along a first path to put the exhaust gas into thermal transfer contact with the cooler to cool the exhaust gas directed to the hydrocarbon retaining system when the monitored temperature of the exhaust gas is below a purge temperature; and
directing the exhaust gas along a second path to the hydrocarbon retaining system, the second path not in thermal transfer contact with the cooler, when the monitored temperature of the exhaust gas is equal to or above the purge temperature.

16. The method of claim 6, further comprising:
directing the exhaust gas routed to the hydrocarbon retaining system along a first path, thereby putting the exhaust gas into thermal transfer contact with a cooler before a purging phase; and
directing the exhaust along a second path, not in thermal transfer contact with the cooler, during the purging phase, the purging phase beginning based on a loading condition of the hydrocarbon retaining system.

17. The method of claim 6, further comprising:
adjusting an injected amount of fuel injected from a fuel injector in response to an amount of hydrocarbons desorbed from the hydrocarbon retaining system and directed to the engine air intake passage.

18. The method of claim 6, further comprising: advancing a spark timing of the engine responsive to an increased cooled EGR quantity directed to the engine air intake passage.

19. A method of operating an engine comprising an emission control device:
routing a selectively adjustable proportion of exhaust gas from downstream of the emission control device to a hydrocarbon retaining system to store hydrocarbons in the hydrocarbon retaining system before an emission device reaches a threshold temperature, the hydrocarbon retaining system being located on an EGR line;
directing a first portion of the exhaust gas from the hydrocarbon retaining system to an engine air intake passage for re-introduction in a combustion chamber of the engine;
directing a second portion of the exhaust gas from the hydrocarbon retaining system to atmosphere;
adjusting the first portion and the second portion in response to engine operating conditions, including, adjusting the first portion in response to at least temperature and combustion stability, where the first portion is reduced and the second portion increased at least in response to a drop in engine combustion stability; and
adjusting a fuel injection amount to the engine in response to temperature of the hydrocarbon retaining system.

20. The method of claim 19 further comprising an adjustable restriction of exhaust gas to increase exhaust backpressure to enable the directing of the first portion to the engine air intake passage of the engine.

* * * * *